No. 669,515. Patented Mar. 12, 1901.
B. P. EVANS.
HOOK AND EYE.
(Application filed July 24, 1900.)
(No Model.)
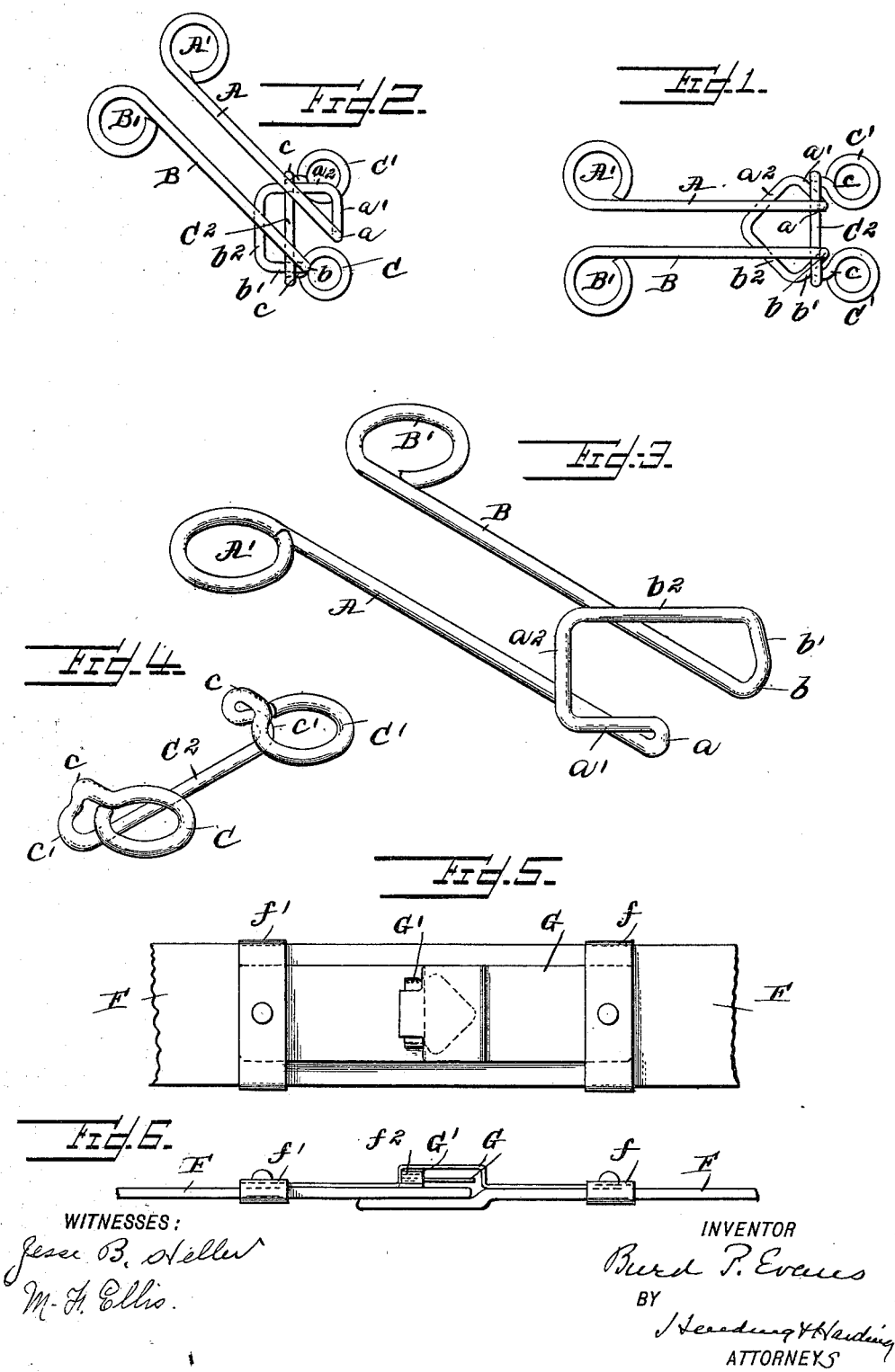
WITNESSES:
Jesse B. Heller
M. H. Ellis.
INVENTOR
Burd P. Evans
BY
Hereding & Harding
ATTORNEYS

UNITED STATES PATENT OFFICE.

BURD P. EVANS, OF PHILADELPHIA, PENNSYLVANIA.

HOOK AND EYE.

SPECIFICATION forming part of Letters Patent No. 669,515, dated March 12, 1901.

Application filed July 24, 1900. Serial No. 24,655. (No model.)

*To all whom it may concern:*

Be it known that I, BURD P. EVANS, a citizen of the United States, residing at Philadelphia, county of Philadelphia, and State of Pennsylvania, have invented a new and useful Improvement in Hook Devices, of which the following is a full, clear, and exact description, reference being had to the accompanying drawings, which form a part of this specification.

My invention has for its object an improved construction of hooks by which the eye member is prevented from being readily detached from the hook. The construction of hook by which I accomplish this result consists in providing the hook end with two members, which converge toward each other, the distance between said members at their point of greatest divergence being greater than the length of the respective members. The eye member to coact with this hook is made of length greater than the length of these members and less than the distance between said members at their point of greatest divergence. By this construction to remove the eye longitudinally will require considerable force, and to remove it without force will require turning the hook or eye until one of the converging members is presented to the eye-engaging member. Thus either way the hook cannot be readily disengaged.

My invention while especially applicable to garment-hooks is also capable of use with every and all classes of hooking or interlocking devices, such as belt-hooks, link chains, &c.

While in the accompanying drawings I have shown my invention embodied in hook devices especially adapted for garments and belt-buckles, I desire it to be understood that I do not intend to limit myself either to the specific devices shown or to the specific uses of such devices, except as the same may be specifically claimed herein.

In the drawings, Figure 1 is a plan view of the hook and eye engaged with one another. Fig. 2 is a similar view showing the entry of the hook into the eye. Fig. 3 is a perspective view of hook. Fig. 4 is a perspective view of eye. Fig. 5 is a plan view showing the hook and eye shown in the form of a belt-buckle. Fig. 6 is an edge view of the same.

Speaking first of the construction of Figs. 1 to 4, A and B are the supporting or shank portions of the hook, having, respectively, the loops A and B for securing the hook to the garment. The hook proper or engaging portion of the hook is formed in the following manner: Each shank member is bent upwardly at $a$ and $b$, respectively, then outwardly at $a'$ and $b'$, respectively, then inwardly, as at $a^2$ and $b^2$, respectively, until the two sides $a^2$ and $b^2$ meet each other. Thus the hook proper is provided with two members $a^2$ and $b^2$, which converge toward each other and in which the distance between said members $a^2$ and $b^2$ at their point of greatest divergence is greater than the length of the members $a^2$ or $b^2$. The eye or engaging member to coact with this hook has the ordinary loops C C' and the supporting or shank members $c\ c$, which at their ends are bent upwardly, outwardly, and inwardly to form offsets $c'\ c'$. $C^2$ is the bar connecting the sides of this eye or engaging member. The length of this bar is greater than the length of the members $a^2$ or $b^2$ and less than the distance $a^3$ between the members $a^2\ b^2$ at their point of greatest divergence. With this construction it may readily be seen that in order to engage or disengage the hook or eye either the hook member or the eye member must be brought into the relation to each other shown in Fig. 2 or considerable force used to engage or disengage them. It is also evident that when they are engaged with each other the parts are firmly held together against disengagement under ordinary conditions, as the hook proper may act as a spring to retain the hook and eye members in connection with each other, and to remove the eye member either sufficient force must be used to overcome this spring or the hook or eye turned so that the eye member can pass off one of the members $a^2\ b^2$.

In Figs. 5 and 6 I have shown my invention as adapted for use with a belt-buckle. F is the belt. Secured to one end of the belt is a clip $f$. Pivoted to this clip $f$ is the hook member G, the hook proper or engaging portion of which is in the same form as the engaging portions of the previously-described hook members, the only substantial difference being that it is made from solid metal instead of wire. To the other end of the belt is secured a clip $f'$, to which is connected an eye $G'$, of the same shape and relation to the hook as the previously-described eye and secured to the clip $f'$ by the shank $f^2$.

While in the embodiments of my invention as shown the members $a^2 b^2$ converge to junction with each other, this is not essential, it being only essential that they shall converge toward each other and that the distance between the members at the point of greatest divergence shall be greater than the length of the converging members.

While I have illustrated my invention as embodied in a garment hook and eye and a belt-buckle, I do not intend to limit myself to these or any specific use of my invention, for, as has been heretofore stated, it may be used for a variety of purposes.

Having now fully described my invention, what I claim, and desire to protect by Letters Patent, is—

1. In combination with a hook provided with two members converging toward each other, the distance between said members at their point of greatest divergence being greater than the length of the respective members, of an eye or engaging member of length greater than the length of the converging members and less than the distance between said members at their point of greatest divergence.

2. In combination with a hook provided with a retaining portion formed by bending the metal at each side of the sustaining portion upwardly, outwardly from each other, and inwardly toward each other, the length of the members converging toward each other being less than the distance between said members at their points of greatest divergence, of an eye or engaging member, of length greater than the length of the converging members and less than the distance between said members at their point of greatest divergence.

In testimony of which invention I have hereunto set my hand at Philadelphia, Pennsylvania, on this 27th day of June, 1900.

BURD P. EVANS.

Witnesses:
M. F. ELLIS,
J. M. SHINDLER, Jr.